United States Patent [19]

Ayler

[11] Patent Number: 4,483,364

[45] Date of Patent: Nov. 20, 1984

[54] HEATER FOR ULTRA HIGH PRESSURE COMPRESSED GAS

[75] Inventor: Steven E. Ayler, China Lake, Calif.

[73] Assignee: The United States of America as represented by the Secretary of the Navy, Washington, D.C.

[21] Appl. No.: 362,354

[22] Filed: Mar. 26, 1982

[51] Int. Cl.[3] ........................ F16K 49/00; F16D 31/02

[52] U.S. Cl. .................................... 137/334; 137/335; 60/413; 60/516; 126/263; 48/191; 138/30

[58] Field of Search ................. 60/413, 418, 329, 516, 60/531, 651, 671, 407; 251/21; 137/468, 334, 335, 341; 138/30, 26; 48/190, 191; 62/384

[56] References Cited

U.S. PATENT DOCUMENTS

| | | | |
|---|---|---|---|
| 586,605 | 7/1897 | Knight | 60/407 |
| 2,315,179 | 3/1943 | Allender | 138/26 |
| 2,519,770 | 8/1950 | Kramer | 23/290 |
| 2,625,804 | 1/1953 | Patch et al. | 62/141 |
| 2,691,518 | 10/1954 | Smith | 60/329 |
| 2,721,447 | 10/1955 | Hancock | 60/329 |
| 2,940,734 | 6/1960 | Harvey | 257/208 |
| 3,062,507 | 11/1962 | Andrus | 257/212 |
| 3,427,011 | 2/1969 | Boyer et al. | 263/40 |
| 3,479,165 | 11/1969 | Lyon | 48/190 |
| 3,498,061 | 3/1970 | Prucha et al. | 60/329 |
| 3,661,483 | 5/1972 | Bose | 62/384 |
| 3,843,010 | 10/1974 | Morse et al. | 138/30 |
| 3,875,435 | 4/1975 | Fletcher | 60/516 |
| 3,987,632 | 10/1976 | Perecla | 60/721 |
| 4,158,084 | 6/1979 | Prentice | 126/263 |
| 4,192,655 | 3/1980 | von Linde | 48/191 |
| 4,211,537 | 7/1980 | Teitel | 48/191 |
| 4,282,903 | 8/1981 | Powell | 137/893 |
| 4,323,220 | 4/1982 | Huelle et al. | 60/531 |
| 4,428,193 | 1/1984 | Papp | 60/509 |

*Primary Examiner*—A. Michael Chambers
*Attorney, Agent, or Firm*—Robert F. Beers; W. Thom Skeer

[57] ABSTRACT

A pneumatic power supply for use in powering servo controls and actuators has a filament wound composite and aluminum ultra-high pressure vessel containing helium within which there is mounted an internal pyrotechnic heat generating element to provide thermal energy to the system. The heater compensates for adiabatic cooling of the gas inventory during blow down, i.e., during delivery of high pressure gas to power pneumatic servo controls and actuators in missiles. At the beginning of the blowdown, the heater element burns at a predetermined rate which adds heat to the compressed gas so that the gas temperature remains relatively constant, effectively increasing run time. The pressurized gas is delivered by means of a pressure regulator from the pressure vessel to the delivery system for use in the pneumatic control system.

8 Claims, 3 Drawing Figures

HEATER FOR ULTRA HIGH PRESSURE COMPRESSED GAS

BACKGROUND OF THE INVENTION

1. Field of the Invention

This invention relates to the field of mechanics. More particularly, this invention relates to the field of power supplies. Still more particularly, but without limitation thereto, this invention relates to the field of pneumatic, compressed gas power supplies for operation of mechanical components of missiles.

2. Description of the Prior Art

Prior power supplies for driving pneumatic servo controls and actuators have used hot gas generators which operate at gas temperatures in the 2000° F. range. Such temperatures necessitate the use of steel components which reduce the efficiency of the system due to the weight of steel components. Such systems also use gases with molecular weights of around 28 which, due to their weight, have slower reaction times than would a system using a lower molecular weight gas.

Attempts to solve the limitations of prior power supplies have led to the proposal of cold gas systems pressurized to approximately 10,000 psi, however these gases are subject to adiabatic cooling factors and have relatively short operational blow down periods.

Research and development work has recently been directed to the development of a 25,000 psi compressed helium power supply. Such a high pressure system would provide increased available power over prior art systems in volume constrained missile designs. As the helium gas is released from a pressurized reservoir the remaining stored gas experiences a temperature decrease due to adiabatic cooling. The temperature drops approximately 260° F. when helium expands from 25,000 psi to 2,000 psi causing higher mass flow rates, reduced operating time, and possible thermal damage to system components. Helium is a desirable operating gas, however, since its high compressibility allows higher molar densities to be achieved at a given temperature and pressure than any other known gas, thus lengthening system run time. Helium gas also has a low molecular weight which reduces control system response time.

SUMMARY OF THE INVENTION

An object of this invention is to provide a lightweight compressed gas power supply.

A further object of this invention is to provide a lightweight compressed gas power supply having increased run times.

A still further object of this invention is to provide a lightweight pneumatic power supply capable of supplying a gas of low molecular weight, thus providing quick response in missile pneumatic servo control and actuator systems.

A still further object of this invention is to provide a lightweight pneumatic power supply supplying gas at moderate temperatures thereby allowing for its use in missile control and actuator systems having components of lightweight aluminum.

These and other objects are attained by the provision of a filament wound composite pressure vessel capable of storing compressed helium at 25,000 psi. This vessel is provided with a regulated outlet for delivery of compressed gas to missile control systems and a pyrotechnic heater mounted within the reservoir to maintain the reservoir gas at operating temperature levels while gas is supplied to the missile system. The pyrotechnic heater includes an igniter to activate the pyrotechnic device upon initiation of compressed gas blow down. This system is capable of supplying helium gas at sufficient pressures for desired run times and at operational temperature such that aluminum system components can be used.

DESCRIPTION OF THE PREFERRED EMBODIMENT

Figure 1:
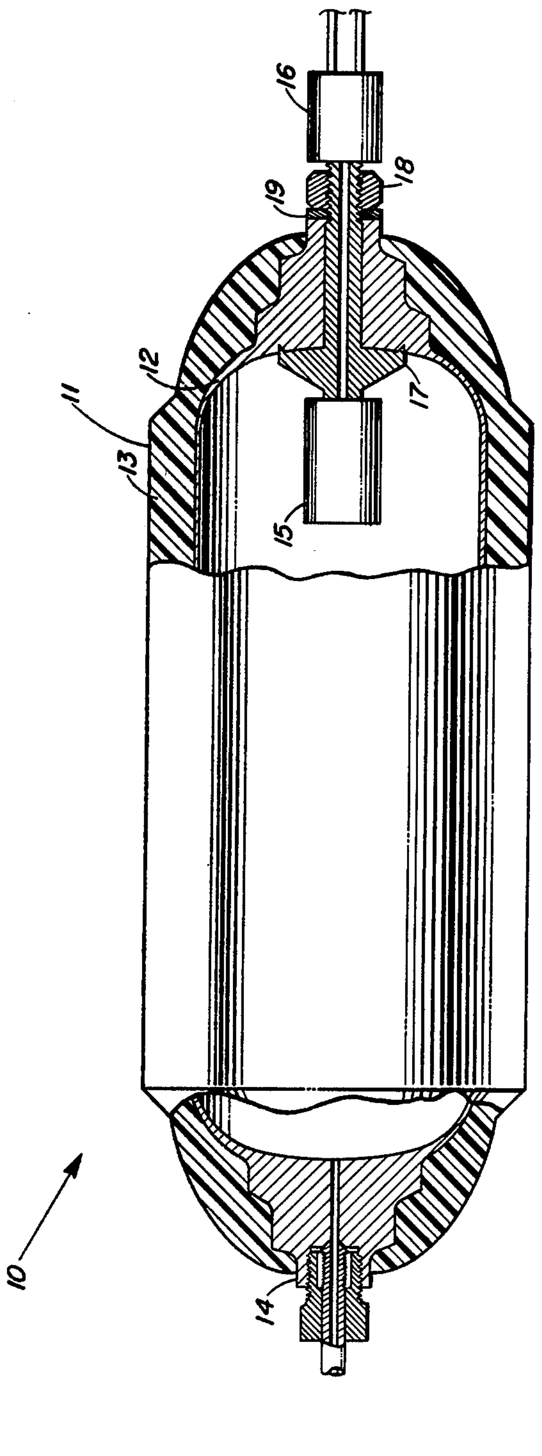
FIG. 1 is a partial sectional view of the pressure vessel of the present invention with the heater element installed.
Figure 2:
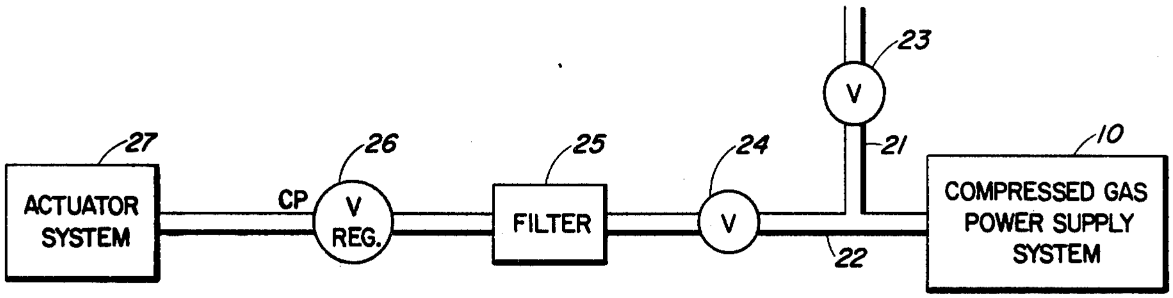
FIG. 2 is a block diagram of the power supply and actuator system.

Referring to FIG. 1 compressed gas power supply system 10 includes a composite pressure vessel 11, having fill/output boss 14, and a gas delivery system 20 (referring to FIG. 2). Composite pressure vessel 11 is made up of a metallic liner 12, and filament wound composite overwrap 13, and a pyrotechnic gas heater element 15. Metallic liner 12 is preferably made of aluminum, while the composite overwrap 13 is a composite material, for example, Kevlar 49/epoxy. Composite pressure vessel 11 is cylindrically shaped with oblate spheroidal ends, said fill/output boss 14 being axially located in one end of vessel 11. Other pressure vessels might be used including metal vessels configured in spherical, cylindrical, or coiled tubular shapes. Composite pressure vessel 11 has high pressure pyrotechnic gas heater element 15 and high pressure igniter 16 axially located by means of boss plug 17 in the end of pressure vessel 11 opposite fill/output boss 14. Boss plug 17 is restrained in the end of vessel 11 with nut 18 and washer 19. In alternative embodiments gas heater element 15 may be a device capable of producing heat by exothermic intermetallic reaction, or an electrical resistance heater. Typical pyrotechnic gas generator devices include an oxidizer such as ammonium perchlorate, and fuel such as powdered aluminum disposed in a cured binder grain such as a polybutadiene binder. Typical metals capable of producing heat are pure metals or metallic compounds such as palladium and aluminum or zirconium and barium chromate, which evolve large amounts of heat through chemical reaction or alloy formation. Direct contact of the heat supplying material with the compressed gas is desired due to the high rate of heat transfer necessary during operation of the power supply system.

Referring to FIG. 2 gas delivery system 20 includes output line 22 with fill line 21 having valve 23, said output line 22 being mounted therein start valve 24, filter 25, and pressure regulator 26 for delivery of high pressure gas from compressed gas power supply 10 to actuator system 27. Fill line 21 is used for charging gas to the compressed gas power supply 10. Start valve 24 as illustrated in FIG. 2 is typically a pyrotechnic device actuated by an electrically fired squib, but may be of mechanical design. Filter 25 removes particulates carried by the gas produced during operation of the pyrotechnic gas heater element 15. Pressure regulator 26 may be of a single stage or two stage design and maintains a relatively constant output gas pressure to the actuator system 27.

In operation, gas blowdown is initiated by firing the squib on the start valve 24. Simultaneously, igniter 16, responsive to an electrical signal, ignites gas heater element 15. Heater element 15 provides heat at a rate sufficient to maintain the temperature of the gas remaining in the reservoir 11 relatively constant during blowdown. Gas is delivered from pressure vessel 11 through output line 22 where it is filtered in filter 25 and the pressure regulated in regulator 26 for delivery to actuator system 27.

It is desirable in some actuator systems to maintain the average temperature of the stored gas between 32° F. and 200° F. to avoid thermal and mechanical damage to the system and maintain system performance. Other systems, however, could tolerate somewhat differing operating temperature ranges. The particular operating temperature range is not critical to operation of the inventive power supply.

Figure 3:
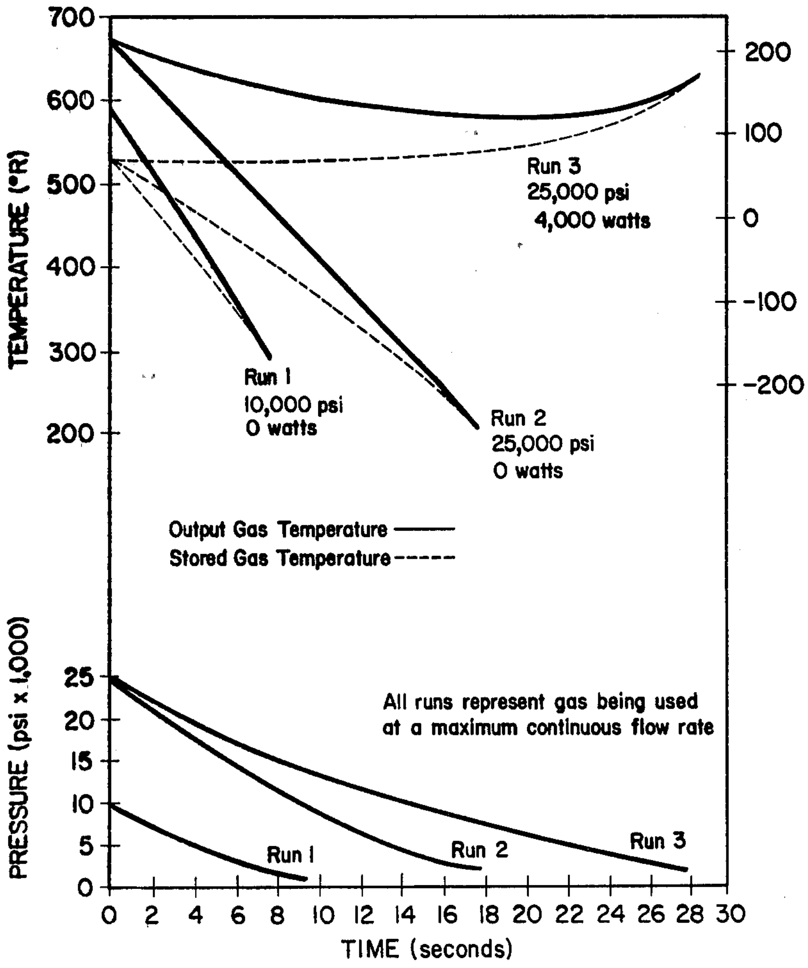
FIG. 3 is a graphical presentation of calculated run parameters showing the adiabatic cooling effect of helium expansion on system performance.

Referring to FIG. 3, calculated outputs of a mathematical model of the thermodynamic properties of helium during blow down from high pressure is presented. Run No. 1 shows calculated parameters for helium using 10,000 psi as a starting pressure, in a representative prior art system showing a large adiabatic cooling factor and a relatively short run time. Run No. 2 shows corresponding parameters for a similar proposed cold gas system operating from 25,000 psi starting pressure with no heat input again reflecting a large adiabatic cooling factor. Run No. 3 shows corresponding parameters for the inventive gas system operating from the 25,000 psi starting pressure with a 4,000 watt heat input which eliminates the adiabatic cooling effect. It is apparent that run times can be significantly increased by addition of heat to the system.

Obviously many modifications and variations of the present invention are possible in light of the above teachings It is therefore to be understood that within the scope of the appended claims the invention may be practiced other than as specifically described.

What is claimed is:

1. A compressed gas power supply comprising:

an ultra high pressure vessel having first and second end walls;

discharging means for channeling the discharge of compressed gas from said pressure vessel mounted at said first end wall comprising a fill/output boss;

controlling means for regulating the flow of compressed gas connected to said discharging means;

a pyrotechnic heater mounted at said second end wall; and means for initiating said heater mounted at said second end wall.

2. The power supply of claim 1 wherein said pressure vessel comprises an aluminum liner having a composite overwrap, said pressure vessel having a cylindrical shape, and said first and second end walls being spheroidal.

3. The power supply of claim 1 wherein said controlling means comprises a start valve and a pressure regulator.

4. The power supply of claim 1 wherein said pyrotechnic heater is a device containing materials which provide heat through exothermic intermetallic reaction.

5. The power supply of claim 1 wherein said pyrotechnic heater includes a mount comprising a boss plug having a threaded portion, a nut threadedly engaging said threaded portion and a washer retained on said boss plug by said nut.

6. The power supply of claim 1 wherein said means for initiating said heater comprises an igniter.

7. The power supply of claim 1 wherein said means for initiating said heater extends through said mounting means to the exterior of said pressure vessel.

8. The power supply of claim 1 wherein said means for initiating the heater is activated upon initiation of the blow down process.

* * * * *